United States Patent Office 3,560,361
Patented Feb. 2, 1971

3,560,361
PRODUCTION OF AZACARBAZOLES
Victor Malcolm Clark, Coventry, and Gordon Ian Gregory and John Derek Cocker, Chalfont St. Peter, England, assignors to Glaxo Laboratories Limited
No Drawing. Filed Mar. 28, 1969, Ser. No. 811,646
Claims priority, application Great Britain, Mar. 29, 1968, 15,327/68
Int. Cl. B01j 1/10
U.S. Cl. 204—158          8 Claims

ABSTRACT OF THE DISCLOSURE

Azacarbazoles are prepared by the photocyclisation of a secondary or tertiary diaryl amine in which each of the two aryl groups is a monocyclic six membered ring attached to the amine nitrogen atom by a nuclear carbon atom and at least one of the aryl groups contains at least one nitrogen atom in the nucleus. A halogen atom may be substituted in the azacarbazole so formed by reaction with a peracid to form an N-oxide derivative thereof which is subsequently reacted with a phosphorus oxyhalide to introduce the halogen atom with elimination of the N-attached oxygen. The halogen substituted azacarbazole may be reacted with a nucleophile to replace the halogen substituent with the residue of the nucleophile. The azacarbazoles have antiviral activity and/or may be employed as intermediates for the production of derivatives having antiviral properties and the 1,6-diazacarbazoles and 1,3,8-triazacarbazoles are new compounds.

---

This invention concerns a novel process for the production of azacarbazoles.

Azacarbazoles, that is heterocyclic compounds possessing a carbazole tri-nuclear structure wherein at least one nuclear carbon atom is replaced by a nitrogen atom, have recently been found to possess antiviral activity. Thus, for example, copending U.S. patent applications Nos. 807,396, 807,397 and 807,427, all of which were filed on Mar. 4, 1969, describe substituted α-carbolines, that is 1-aza-carbazoles, and U.S. application No. 811,647 of even date herewith describes diazacarbazoles, all of which substances have shown interesting antiviral properties and/or can serve as intermediates for the production of derivatives having antiviral properties.

Hitherto, these tri-nuclear heterocyclic compounds have required lengthy synthetic processes often giving relatively low yields of the desired product, particularly where the nucleus is required to carry substituents. We have now devised a novel method for the synthesis of aza-carbazoles which enables a wide range of such compounds including many compounds which have not previously been described, to be produced from readily available starting materials in relatively few reaction stages.

We have found that aza-carbazoles can readily be synthesized by subjecting to photocyclisation a secondary or tertiary diarylamine, each of the two aryl groups of which is a monocyclic six-membered ring attached to the amine nitrogen atom via a nuclear carbon atom, at least one aryl group possessing one or more nuclear nitrogen atoms. it is observed that only a carbon-carbon bond is formed in the cyclisation and that where it would be possible for either a nitrogen atom or a carbon atom in one nucleus to be conformationally adjacent to a carbon atom in the other nucleus, only the carbon atom will enter into the reaction.

The new reaction may be illustrated with reference to the following skeletal structures

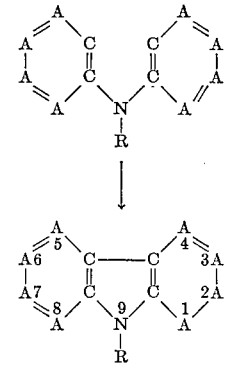

where one or more of the symbols A represents a nitrogen atom while the remainder represent carbon atoms and R represents a hydrogen atom or a substituted or unsubstituted aliphatic or araliphatic group). There are preferably not more than three nitrogen atoms in each aryl ring.

The diarylamines used as starting material may carry nuclear substituents. Preferably, the positions ortho to the bridging amino group do not carry substituents. The nuclear substituents may, for example, be aliphatic hydrocarbon groups, e.g. alkyl groups such as methyl, ethyl, propyl, butyl, amyl or hexyl groups, halogen atoms, e.g. chlorine or bromine atoms or residues of nucleophiles, especially residues of oxygen or nitrogen nucleophiles.

Particularly interesting residues of nucleophiles include amino groups or ether groups carrying one or, in the case of amino groups, either, one or two, saturated or unsaturated, straight, branched or cyclic aliphatic substituents, preferably having 1–10 carbon atoms, e.g. alkyl, or cycloalkyl groups. The N-, or O- substituents may themselves carry substituents, for example hydroxy, amino or substituted amino groups or ether groups e.g. mono- or dialkylamino, or alkoxy groups (preferably having 1–6 carbon atoms). The amino groups may also usefully be N-attached heterocyclic groups which may carry further heteroatoms, for example piperidino, piperazino, morpholino, pyrrolidino or 2-methyl-pyrrolidino groups.

The amino groups may include, for example, mono- or di-methyl-, ethyl-, butyl-, propyl- or hexyl- amino groups.

The diarylamine may be a secondary amine or a tertiary amine carrying an aliphatic or araliphatic group as the third N-substituent for example, a methyl, ethyl, benzyl, phenethyl propyl, butyl, amyl or hexyl group. Any aliphatic substituents which are present may carry one or more amino, mono- or di-alkylamino, hydroxy or ether groups.

We have found that electron-releasing nuclear groups such as alkyl or alkylamine groups promote faster cyclisation than do halogen atoms, and the reaction proceeds more rapidly when R is an aliphatic or araliphatic group than when R is a hydrogen atom.

As indicated above, at least one of the aryl groups has one or more nuclear nitrogen atoms and groups of this type include, for example, carbon-attached pyridyl, pyrimidyl and pyrazinyl groups. One of the two aryl groups may, of course, contain no nuclear nitrogen and may thus be a phenyl or substituted phenyl group.

The photocyclisation of 2-, 3-, and 4- anilino-pyridines yields α-, β-, and δ-, and γ-carbolines respectively and, where substituents are present in the phenyl and/or pyridyl nuclei, can yield substituted carbolines. Since very many substituted anilines and pyridines are commercially available and may readily be coupled to form anilino-pyridines, the new method provides a very direct route to a wide range of carbolines.

The photocylisation of bispyridylamines yields azacarbazoles having nitrogen atoms in each of the three nuclei and for example, bis-pyrid-2-yl-amine yields 1,8-diazacarbazole. 4-anilinopyrimidine yields 1,3-diazacarbazole and 2-anilino-pyrazine yields 1,4-diaza-carbazole while 4-(pyrid-2-ylamino)-pyrimidine yields 1,3,8-triazacarbazole. Bis-pyrid-4-yl-amine yields 3,6-diazacarbazole. 2,4-dipyridylamine yields 1,6-diazacarbazole. Where there are two nuclear hydrogen atoms adjacent to the bridging amino grouping, isomers may be formed but can be separated by conventional techniques such as chromatography, particularly column or layer chromatography on silica gel.

The photocyclisation reaction may be effected in an inert solvent medium, for example an aliphatic or cycloaliphatic hydrocarbon, e.g. hexane, heptane or cyclohexane, an aromatic hydrocarbon, e.g. benzene, an alcohol, e.g. a lower alkanol such as methanol, ethanol, propanol, isopropanol or tertiary butanol or a cyclic or acylic ether, e.g. diethyl ether, diisopropyl ether, dioxan or tetrahydrofuran. Mixtures of such solvents can also be used, for example, ethanol/benzene.

The concentration of the amine starting material is preferably low to avoid intermolecular reactions and may, for example, be as low as 0.001% w./v. The lower concentrations also seem to promote faster reaction and the concentration is preferably not greater than 1.0% advantageously being in the range 0.05 to 0.5% w./v.

The reaction time depends on a number of factors but the time at which the concentration of desired product reaches a maximum may readily be followed by spectrophotometric examination of aliquots or by thin layer chromatography. Times in the range 2–200 hours are usually required.

The radiation used to produce cyclisation should include the wavelengths absorbed by the azadiarylamine, preferably within the range 240 to 360 nm.

The axacarbazoles produced by the process according to the invention may be converted subsequently, if desired, into derivatives having substituents in the nucleus, (or additional substituents where the nucleus is already substituted) for example using the methods described in relation to the α-carbolines in above-mentioned copending U.S. patent applications Ser. Nos. 807,396 and 807,427.

These methods include, for example, formation of an N-oxide by reaction of the axacarbazole with a peracid, followed by subsequent transformation of the N-oxide.

The peracid used for N-oxidation may be organic, e.g. an aliphatic peracid such as peracetic or trifluoro- or trichloro-peracetic acid, or an aromatic peracid such as perbenzoic or m-chloroperbenzoic acid. Inorganic peracids such as permonosulphuric acid or Caro's acid may be also used.

The oxidation may be effected over a wide temperature range, for example between −20° and 120° C. Whereas m-chloroperbenzoic acid oxidises rapidly at room temperature, peracetic acid oxidises best at about 60° C. The peracid may be separately prepared or may be formed in situ by adding the corresponding carboxylic acid, e.g. acetic acid, together with hydrogen peroxide. In the latter case, it is often necessary to add further hydrogen peroxide during the reaction.

Where a liquid acid and hydrogen peroxide are used as the source of peracid, the acid may serve as reaction solvent. An inert solvent may also be present, however, for example a hydrocarbon or chlorinated hydrocarbon solvent, e.g. chloroform, dichloroethylene, benzene or toluene.

The N-oxide may then be reacted with a phosphorus oxyhalide, e.g. phosphorus oxychloride or oxybromide, whereby a halogen atom is introduced. The position of the halogen atom depends on the azacarbazole concerned and, for example, will be introduced at the 4-position of a 1-azacarbazole (or in the 2-position if the 4-position carries a substituent) the 2- and/or 4-position of a 1,3-diazacarbazole or the 2,4,5 and/or 7 position of a 1,8-diazacarbazole, where at least one of these positions is unsubstituted.

The N-oxide is preferably reacted with the oxyhalide in a substituted amide, imide or hydantoin solvent to provide a solvent medium, or an excess of oxyhalide can be used as solvent together with about 0.5–5% v./v. water then being advantageously added; an alkali metal salt such as a lithium halide may also be present.

Such halides possess antiviral activity but also serve as valuable intermediates in the preparation of further antiviral compounds since they react with nucleophilic reagents to replace the halogen by the residue of the nucleophile. The nucleophile may thus, for example be a nitrogen, oxygen, sulphur or carbon nucleophile. Oxygen and sulphur nucleophiles are preferably reacted with the halogeno-diazacarbazole in the form of a metal derivative thereof or in the presence of a base.

Residues of nitrogen nucleophiles include, for example unsubstituted or mono- or di- substituted amino groups. The substituted amino groups may, for example, carry either one or two aliphatic, araliphatic or aryl substituents which may themselves carry further substituents such as ether groups, hydroxyl groups, carboxyl groups, nitrile groups, esterified carboxyl groups, unsubstituted or mono- or di- substituted amino groups or thioether or mercapto groups.

Residues of oxygen nucleophiles include, for example, ether groups e.g. O-aliphatic, O-araliphatic or O-aryl groups which may themselves carry substituents, for example one or more of the substituents mentioned in the preceding paragraph in relation to N-nucleophiles.

Residues of sulphur nucleophiles include principally the sulphur analogues of the O-nucleophile residues listed above.

Particularly preferred groups include monoalkylamino or substituted monoalkylamino groups having 3 or more carbon atoms, e.g. propyl-, butyl- or amyl-amino, 6-hydroxyhexylamino, 3-butoxypropylamino- or diethylaminoethylamino groups, and alkoxy and alkylthio groups, having 3–6 carbon atoms, and in particular hydroxyalkoxy groups such as the 3-hydroxypropoxy group.

The N-oxide may also be reacted with an acylating agent to add an acyloxy group at the ortho-position or may be reacted as described in relation to the α-carbolines in copending application No. 807,396 with an alkylating or aralkylating agent to form an N-alkoxy- or aralkoxy-azacarbazolinium salt. This salt or the corresponding anhydronium base (where it exists) may then be reacted with a nucleophile to add a nucleophile residue at the ortho position, while the N-alkoxide, or N-aralkoxide grouping is eliminated.

In order to introduce an aliphatic or araliphatic substituent at the 9-position, a 9-unsubstituted azacarbazole may be converted into an alkali metal derivative thereof and reacted with an aliphatic or araliphatic reactive ester, for example a halide, sulphate or sulphonate ester. Groups which may be introduced in this may include, for example, alkyl groups such as methyl, ethyl or propyl groups or aralkyl groups such as benzyl groups.

The diarylamine starting materials for the photocyclisation reaction may be prepared by reaction of a halogen substituted pyridine or aza-pyridine, e.g. pyrimidine, with an aniline or a heterocyclic arylamine.

Where a symmetrical amine is required this may be prepared by elimination of ammonia from two molecules of a suitable amine.

The 1,6-diazacarbazoles and the 1,3,8-triazacarbazoles are new ring systems and constitute a further feature of the invention. They advantageously carry nuclear substituents such as those described above, especially halogen atoms such as chlorine atoms or alkylamino groups, notably the n-butylamino group. 4-chloro-1,3,8-triazacarbazole is a valuable intermediate in the production of 4-substituted 1,3,8-triazacarbazoles and 4-n-butylamino-1,3,8-triazacarbazole has shown marked activity against Adenovirus SV 17 Influenza virus A 2, Coxsackie virus A 21 and, in particular, Rhinovirus types 1 and 5.

The following examples are given by way of illustration only; all temperatures are in ° C.

EXAMPLE 1

9-methyl-1,8-diazacarbazole

A solution of N,N-dipyrid - 2 - ylmethylamine (0.58 g.) in cyclohexane (500 ml.) was irradiated for 12 hr. in an open vessel with a medium pressure Hanovia ultraviolet lamp fitted with a water cooled Pyrex sleeve. The lamp was cleaned at hourly intervals to remove traces of insoluble by-products. The resulting solution was filtered and the filtrate evaporated to give a sticky, partly crystalline yellow mass (0.428 g.). Crystallisation from cyclohexane gave 9-methyl-1,8-diazacarbazole (0.226 g.), M.P. 126–129.5° raised by recrystallisation from isopropanol to 128.5–131.5°, $\lambda_{max.}^{EtOH}$ 267, 298, 331 nm. ($\epsilon$ 15,750; 21,000; 2,520)

(Found (percent): C, 71.9; H, 5.0; N, 22.85. $C_{11}H_9N_3$ requires (percent): C, 72.1; H, 4.95; N, 22.95.)

The starting material was prepared as follows: Sodium hydride (2.3 g.) was added cautiously to a stirred solution of dipyrid-2-ylamine (A. E. Tschitschibabin and W. A. Preobrashensky, Ber., 1928, 61B, 199) (13.7 g.) in dry toluene (150 ml.) and the mixture was stirred for 1 hr. Methyl iodide (5.25 ml.) was added and the mixture was heated at reflux for 7 hr. A further portion of methyl iodide (2.5 ml.) was added and the mixture was refluxed for a further 6 hr. A few drops of water were added to the cooled reaction mixture and the toluene was removed by evaporation. The residue was partitioned between water and ethyl acetate (after removing material insoluble in both phases). Evaporation of the ethyl acetate gave a dark brown oil (8.3 g.). This was dissolved in ether (ca. 100 ml.) filtered from tarry material and treated with an excess of ethanolic hydrogen bromide solution. The crude hydrobromide was leached with warm isopropanol to give N,N-dipyrid-2-ylmethylamine dihydrobromide (5.35 g.) M.P. 230–4°. (Found (percent): C, 38.2; H, 3.7; Br, 45.4; N, 11.8. $C_{11}H_{11}N_3 \cdot 2HBr$ requires (percent): C, 38.05; H, 3.75; Br. 46.0; N, 12.1) Treatment with alkali of the dihydrobromide gave the oily base.

EXAMPLE 2

9-benzyl-1,8-diazacarbazole

A solution of N,N-dipyrid - 2 - ylbenzylamine (0.314 g.) in cyclohexane (700 ml.) was irradiated in a rotating glass tube with light from an Atlas 20 watt ultraviolet fluorescent tube (main emission at 325–375 nm.) for 3 hr. The solution was filtered and evaporated to dryness. The residue (0.312 g.) was triturated with isopropyl ether and filtered. The solid (0.17 g.) was crystallised from cyclohexane to give 9-benzyl-1,8-diazacarbazole (0.124 g.) M.P. 146–8°, $\lambda_{max.}^{EtOH}$ 265, 298, 330 nm. ($\epsilon$ 12,800; 19,050; 2,260)

(Found (percent): C, 78.5; H, 5.3; N, 16.3. $C_{17}H_{13}N_3$ requires (percent): C, 78.5; H, 5.0; N, 16.2.)

The starting material was prepared as follows: Sodium hydride (0.73 g.) was added to a stirred solution of di-pyrid-2-ylamine (5.1 g.) in dry dimethoxyethane (70 ml.) and the mixture stirred for 1½ hr. Benzyl bromide (3.55 ml.) was added and the mixture was refluxed for 8 hr. The mixture was then treated similarly with further portions of sodium hydride (0.365 g.) and benzyl bromide (1.8 ml.) and refluxed a further 3 hr. A few drops of water were added to the cooled reaction mixture and the insoluble material filtered off. Evaporation of the filtrate gave a residue that was dissolved in benzene and treated with charcoal and then crystallised and recrystallised from isopropanol to give N,N-dipyrid-2-ylbenzylamine (1.5 g.) M.P. 79–81.5° raised by further recrystallisation from isopropanol to 80–82.5°. (Found (percent): C, 78.0; H, 6.05; N, 16.2. $C_{17}H_{15}N_3$ requires (percent): C, 78.1; H, 5.8; N, 16.1.)

EXAMPLE 3

4,5-dimethyl-1,8-diazacarbazole

A solution of di-(4-methylpyrid-2-yl)-amine (0.717 g.) in cyclohexane (800 ml.) was irradiated in a rotating glass tube with light from a 30 watt germicidal fluorescent tube (main emission at 254 nm.) for 16 hr. The solvent was evaporated, the residual gum was triturated with ether to give the crude product (0.365 g.). A portion 0.27 g. crystallised from 2-methoxyethanol gave 4,5-dimethyl-1,8-diazacarbazole (0.085 g.), M.P. 303–6°.

$\lambda_{max.}^{EtOH}$ 262, 297 and 324 nm. ($\epsilon$ 15,250; 21,050 and 4,700)

(Found (percent): C, 73.2; H, 5.6; N, 21.4. $C_{12}H_{11}N_3$ requires (percent): C, 73.1; H, 5.6; N, 21.3.)

The starting material was prepared as follows:

A mixture of 2-amino-4-picoline (10.8 g.) and ethanolic hydrogen chloride (2.78 N; 18 ml.) was cautiously heated to 240° allowing the ethanol to distil off. The mixture was heated for 24 hr. cooled and poured into water (ca. 100 ml.). The solution was acidified with dilute hydrochloric acid and filtered and excess sodium carbonate solution was added. The precipitated solid (3.16 g.) was collected, dissolved in ether and filtered. Evaporation of the ether gave a solid (2.97 g.) that was crystallised from cyclohexane to give di-(4-methylpyrid-2-yl)-amine (2.5 g.) M.P. 120–2°.

$\lambda_{max.}^{EtOH}$ 268, 309 nm. ($\epsilon$ 19,650; 13,600)

(Found (percent): C, 72.5; H, 6.6; N, 21.0. $C_{12}H_{13}N_3$ requires (percent): C, 72.3; H, 6.6; N, 21.1.)

EXAMPLE 4

4,5-dimethyl-1,8-diazacarbazole

A solution of di-(4-methylpyrid-2-yl)-amine (2.45 g.) in absolute ethanol (1.6 l.) was irradiated in a rotating glass tube with light from a 30 watt germicidal fluorescent tube (main emission at 254 nm.) for 60 hr. The solvent was evaporated and the residue, crystallised from 2-methoxyethanol, gave 4,5-dimethyl-1,8-diazacarbazole (1.03 g.) M.P. 304–7° identical with that prepared in Example 3.

EXAMPLE 5

4,5-dimethyl-1,8-diazacarbazole-1-oxide m-Chloroperoxybenzoic acid (78.5% active oxygen 1.64 g.) in chloroform (15 ml.) was added to a stirred suspension of 4,5-dimethyl-1,8-diazacarbazole (1.40 g.) in chloroform (15 ml.). The solids dissolved and after 10 minutes a yellow solid separated. After 1 hour the chloroform was evaporated and the residue was stirred with excess 2 N sodium carbonate solution. The crude product (1.353 g.) M.P. 286° (dec.) was collected and recrystallised from 2-methoxyethanol (100 ml.) to give the desired 1-oxide (0.90 g.) M.P. 294° (dec.)

$\lambda_{max.}^{EtOH}$ 257, 281, 298 nm. ($\epsilon$ 17,800; 15,300; 15,400)

(Found (percent): C, 67.45; H, 5.3; N, 19.25. $C_{12}H_{11}N_3O$ requires (percent): C, 67.6; H, 5.2; N, 19.7.)

EXAMPLE 6

2-chloro-4,5-dimethyl-1,8-diazacarbazole 4,5-dimethyl-1,8-diazacarbazole-1-oxide (0.90 g.) was stirred in dimethylformamide (10 ml.) with phosphorus oxychloride (0.8 ml.) for 1 hr. The mixture was poured into water (50 ml.) and treated with excess sodium carbonate solution and the precipitated solid (containing starting material) was collected (0.872 g.). This solid in dimethylformamide (10 ml.) was treated with phosphorus oxychloride (0.6 ml.) and after 16 hr. the crude product was isolated as above (0.727 g.) Thin layer chromatography showed that the crude product contained two major components and these were separated by preparative layer chromatography on silica eluting with 2% methanol in chloroform. The less polar component crystallised from 2-methoxyethanol to give 2-chloro-4,5-dimethyl-1,8-diazacarbazole (0.165 g.) M.P. 273–6°

$\lambda_{max.}^{EtOH}$ 232, 262, 299 nm. ($\epsilon$ 21,700; 15,000; 22,100)

(Found (percent): C, 62.05; H, 4.6; Cl, 15.3; N, 17.9. $C_{12}H_{10}ClN_3$ requires (percent): C, 62.2; H, 4.4; Cl, 15.3; N, 18.1.)

EXAMPLE 7

1,8-diazacarbazole

A solution of dipyrid-2-ylamine (A. E. Tschitschibabin and W. A. Preobrashensky Ber. 1928, 61B, 199). (0.75 g.) in absolute ethanol (1.5 l.) was irradiated in a rotating glass tube with light from a fluorescent tube (main emission at 254 nm.) for 85 hr. Evaporation of the solvent gave a yellow gum (0.93 g.). A mixture of chloroform and benzene (1:1) eluted the crude product (0.293 g.) from a column of Grade IV, basic alumina (Woelm). Crystallisation from benzene gave pure 1,8-diazacarbazole (0.144 g.) M.P. 228–9°

$\lambda_{max.}^{EtOH}$ 226, 261, 298 nm. ($\epsilon$ 22,800; 13,800; 21,400)

(Found (percent): C, 70.6; H, 4.5; N, 24.4. $C_{10}H_7N_3$ requires (percent): C, 71.0; H, 4.15; N, 24.8.)

EXAMPLE 8

1,8-diazacarbazole

An experiment similar to Example 7 but using n-propanol as the solvent and an irradiation time of 61 hr. gave 1,8-diazazcarbazole (0.18 g.) M.P. 228–30°.

EXAMPLE 9

1,8-diazacarbazole

An experiment similar to Example 7 but using iso-propanol as the solvent and an irridation time of 40 hr. gave 1,8-diazacarbazole (0.10 g.), M.P. 228–31°.

EXAMPLE 10

9-methyl-1,8-diazacarbazole

A solution of N,N-dipyrid-2-ylmethylamine (1.16 g.) in analytically pure benzene (800 ml.) was irradiated in a rotating glass tube with light from an Atlas 20 watt ultraviolet fluorescent tube (main emission at 325–375 nm.) for 20 hr. Isolation as in Example 1 gave 9-methyl-1-8-diazacarbazole (0.128 g.) M.P. 129–32° identical with the material prepared in Example 1.

EXAMPLE 11

4-chloro-1,3-diazacarbazole 6-anilino-4-chloropyrimidine (185 mg.) (H.C. Carrington, F. H. S. Curd and D. N. Richardson, J., 1955, 1858) in cyclohexane (600 ml.) was irradiated for 16 hr. using a Hanovia medium pressure mercury lamp and a Pyrex filter The solvent was evaporated and the residue was applied to a 20 x 20 cm. plate coated with kieselgel HF. Development with 2% methanol in chloroform resolved the mixture into two bands. Elution of the slower band with 10% methanol in chloroform gave 4-chloro-1,3-diazacarbazole (33 mg.) M.P. 274–276° (from EtOAc)

$\lambda_{max.}^{EtOH}$ 238, 252, 290 nm. ($\epsilon$ 23,400: 30,350 and 11,100)

(Found (percent): C, 58.9; H, 3.1; Cl, 17.3; N, 20.4. $C_{10}H_6ClN_3$ requires (percent): C, 59.0; H, 3.0; Cl, 17.4; N, 20.6.)

EXAMPLE 12

4-chloro-9-methyl-1,3-diazacarbazole 4-chloro-6-(N-methylanilino)-pyrimidine (200 mg.) in cyclohexane (400 ml.) was irradiated for 8.5 hr. using a Hanovia medium pressure mercury lamp and a Pyrex filter. Solvent was removed and the residue in chloroform was applied to a 20 x 20 cm. plate of kieselgel HF. Development with 2% methanol in chloroform gave one main band. Elution of this band with 10% methanol in chloroform gave 4-chloro-9-methyl-1,3-diazacarbazole (71 mg.), M.P. 128–130° (from cyclohexane)

$\lambda_{max.}^{EtOH}$ 242, 259, 293 nm. ($\epsilon$ 22,600, 29,500, 9,300)

(Found (percent): C, 59.8; H, 3.9; Cl, 16.0; N, 19.0. $C_{11}H_8ClN_3$ requires (percent): C, 60.7; H, 3.7; Cl, 16.3; N, 19.3.)

The starting material was prepared as follows: 4,6-dichloropyrimidine (2.95 g.), N-methylaniline (2.5 ml.), hydrochloric acid (0.2 ml.), acetone (10 ml.) and water (15 ml.) were heated under reflux for 1.5 hr. Dilution with water and extraction with ethyl acetate gave an oil which was applied in benzene onto a column of silica gel (160 g.). Elution with 7% ethanol in benzene gave 4-chloro-6-(N-methylanilino)-pyrimidine (2.18 g.), M.P. 59–61°

$\lambda_{max.}^{EtOH}$ 256 nm. ($\epsilon$ 14,100)

(Found (percent): C, 59.5; H, 4.8; Cl, 16.2; N, 19.1. $C_{11}H_{10}ClN_3$ requires (percent): C, 60.1; H, 4.6; Cl, 16.1; N, 19.1.)

EXAMPLE 13

4-(n-butylamino)-9-methyl-1,3-diazacarbazole 4-(n-butylamino) - 6 - (N-methylanilino)-pyrimidine (380 mg.) in cyclohexane (760 ml.) was irradiated for 10 hr. using a Hanovia medium pressure mercury lamp fitted with a Pyrex sleeve. Solvent was removed and the residue applied to a 20 x 20 cm. plate of kieselgel. Development with chloroform gave one major band. Elution of this band with 10% methanol in chloroform afforded 4-(n-butylamino)-9-methyl-1,3-diazacarbazole (125 mg.), M.P. 106–108° (from cyclohexane)

$\lambda_{max.}^{EtOH}$ 250, 293, 312, 323 nm. ($\epsilon$ 42,000, 12,000, 9,200, 12,000).

(Found (percent): C, 70.3; H, 7.1; N, 21.7. $C_{15}H_{18}N_4$ requires (percent): C, 70.8; H, 7.1; N, 22.0.)

The starting material was prepared as follows: n-butylamine (1.5 ml.) was added to 4,6-dichloropyrimidine (1.0 g.). After the rapid exothermic reaction the resultant solid was partitioned between ethyl acetate and water. Removal of the ethyl acetate gave 4-(n-butylamino)-6-chloropyrimidine (1.12 g.), M.P. 74–76°

$\lambda_{max.}^{EtOH}$ 247 nm. ($\epsilon$ 10,000)

(Found (percent): C, 51.1; H, 6.7; Cl, 18.5; N, 22.8. $C_8H_{12}ClN_3$ requires (percent): C, 51.7; H, 6.5; Cl, 19.1; N, 22.8.)

The above 4-(n-butylamino)-6-chloropyrimidine (0.62 g.) and N-methylaniline (5 ml.) were heated at 195° for 3.5 hr. Dilution with water and extraction with ethyl acetate gave an oil which was applied in chloroform to a 20 x 20 cm. plate of silica gel. Development with 5% methanol in chloroform resolved the product into two bands. Elution of the slower band with 10% methanol in chloroform gave 4-(n-butylamino) - 6 - (N-methylanilino)-pyrimidine (0.42 g.), M.P. 71–73°.

EXAMPLE 14

4-(3'-hydroxypropoxy)-9-methyl-1,3-diazacarbazole 4-chloro-9-methyl-1,3-diazacarbazole (320 mg.) and a solution of sodium hydride (138 mg.) in propane-1,3-diol was heated at 100° for 40 min. The reaction mixture was poured into water and the product was isolated in ethyl acetate. Solvent was evaporated and the residue applied to a 20 x 20 cm. plate coated with kieselgel HF and developed with chloroform. Elution of the slower running band with methanol-chloroform (1:5) gave 4-(3'-hydroxypropoxy)-9-methyl - 1,3 - diazacarbazole (220 mg.) M.P. 99–101° (from cyclohexane)

$\lambda_{max.}^{EtOH}$ 230, 295 nm. ($\epsilon$41,200, 12,350)

(Found (percent): C, 64.9; H, 5.8; N, 16.2. $C_{14}H_{15}N_3O_2$ requires (percent): C, 65.4; H, 5.9; N, 16.3.)

EXAMPLE 15

4-(n-butylamino)-9-methyl-1,3-diazacarbazole 4-chloro-9-methyl-1,3-diazacarbazole (250 mg.) and n-butylamine (3 ml.) were refluxed for 0.5 hr. The reaction mixture was poured into water and the product isolated with benzene. Evaporation of the solvent gave a gum which crystallised from cyclohexane to give 4-(n-butylamino)-9-methyl-1,3-diazacarbazole (210 mg.), M.P. 107–108°.

(Found (percent): C, 70.2; H, 7.0; N, 22.1. $C_{15}H_{18}N_4$ requires (percent): C, 70.8; H, 7.1; N, 22.0.)

EXAMPLE 16

4-(n-butylamino)-1,3-diazacarbazole

A solution of 4-chloro-1,3-diazacarbazole (400 mg.) in n-butylamine (5 ml.) was refluxed for 4 hr. and then poured into water. Filtration gave 4-(n-butylamino)-1,3-diazacarbazole (311 mg.) M.P. 197–198° (from cyclohexane)

$\lambda_{max.}^{EtOH}$ 245, 289, 307, 318 nm. ($\epsilon$ 40,000; 12,200; 9,500; 13,500)

(Found (percent): C, 69.9; H, 6.7; N, 23.0. $C_{14}H_{16}N_4$ requires (percent): C, 70.0; H, 6.7; N, 23.3.)

EXAMPLE 17

4-(3'-n-butoxypropylamino)-1,3-diazacarbazole 4-chloro-1,3-diazacarbazole (348 mg.) and 3-n-butoxypropylamine (1 ml.) were heated at 175° for 2 hr. The reaction mixture was partitioned between benzene and water. Removal of the benzene gave 4-(3'-n-butoxypropylamino)-1,3-diazacarbazole (230 mg.) M.P. 151–152° (from isopropanol), $\lambda_{max.}^{EtOH}$ 245, 289, 308, 319 nm. ($\epsilon$ 37,400; 10,500; 7,760; 10,900).

(Found (percent): C, 68.5; H, 7.5; N, 19.2. $C_{17}H_{22}N_4O$ requires (percent): C, 68.4; H, 7.4; N, 18.8.)

EXAMPLE 18

1,8-diazacarbazole

A solution of dipyrid-2-ylamine (8.0 g.) in tertiary butanol (4 l.) was maintained at 45° and irradiated with light from two 3 ft. fluorescent tubes (main emission at 254 nm.) in a falling film apparatus (Cohen, Mijovic, Newman and Pitts, Chem. and Ind., 1967, 1079) for 96 hr. The solvent was evaporated and the residue partitioned between ethyl acetate and normal hydrochloric acid solution. Isolation of basic material and trituration with ether gave slightly impure 1,8-diazacarbazole (3.45 g.) M.P. 221–7°.

EXAMPLE 19

1,8-diazacarbazole-1-oxide m-Chloroperbenzoic acid (68.5% active oxygen, 4.40 g.) was added to a stirred suspension of 1,8-diazacarbazole (2.69 g.) in chloroform (75 ml.). The solids dissolved and after 10 mins. solid started to separate. After 2½ hr. the chloroform was evaporated under reduced pressure and the residue stirred with excess sodium carbonate solution. The product was collected (2.92 g.); M.P. >240° (decomp.). A sample (400 mg.) crystallised from water (50 ml.) containing a little isopropanol gave 1,8-diazacarbazole-1-oxide (198 mg.) M.P. 272–7° (decomp.).

$\lambda_{max.}^{EtOH}$ 237, 277, 300 nm. ($\epsilon$ 20,100; 18,400; 15,900)

(Found (percent): C, 65.1; H, 4.0; N, 22.7. $C_{10}H_7N_3O$ requires (percent): C, 64.85; H, 3.8; N, 22.7.)

EXAMPLE 20

4-chloro-1,8-diazacarbazole 1,8-diazacarbazole-1-oxide (2.5 g.) was stirred with dimethyl formamide (30 ml.), and treated with phosphorus oxychloride (3.0 ml.). After 2½ hr. the reaction mixture was poured into water (200 ml.) and treated with excess sodium carbonate solution. The crude product was collected (2.146 g.) and crystallised from butyl acetate to give 4-chloro-1,8-diazacarbazole (1.32 g.) M.P. 234.5–237°, $\lambda_{max.}^{EtOH}$ 230, 261, 297 nm. ($\epsilon$ 21,650; 16,600; 21,250)

(Found (percent): C, 58.4; H, 2.9; Cl, 17.9; N, 20.4. $C_{10}H_6ClN_3$ requires (percent): C, 59.0; H, 3.0; Cl, 17.4; N, 20.65.)

EXAMPLE 21

4-(n-butylamino)-8-diazacarbazole

A mixture of 4-chloro-1,8-diazacarbazole (0.40 g.) and n-butylamine (4.0 ml.) was heated in a sealed tube to 200° for 16 hr. Evaporation of the cooled reaction mixture and trituration with water containing a little sodium carbonate solution gave a crude product (0.495 g.) M.P. 194–8° that was crystallised from ethanol to give 4-(n-butylamino)-1,8-diazacarbazole (0.40 g.) M.P. 199–201.5°, $\lambda_{max.}^{EtOH}$ 227, 252, 272, 298, 338 nm. ($\epsilon$ 21,800; 21,850; 12,000; 6,400; 12,350).

(Found (percent): C, 70.4; H, 6.8; N, 22.9. $C_{14}H_{16}N_4$ requires (percent): C, 70.0; H, 6.7; N, 23.3.)

EXAMPLE 22

1,8-diaza-4-(6'-hydroxyhexylamino)-carbazole

A mixture of 4-chloro-1,8-diazacarbazole (0.40 g.) and 6-hydroxyhexylamine (0.70 g.) was heated to 190° for 1 hr. The cooled reaction mixture was treated with water containing a little sodium carbonate solution and the crude base (0.55 g.) converted to its hydrobromide. Crystallisation from ethanol gave 1,8-diaza-4-(6'-hydroxyhexylamino)-carbazole hydrobromide (0.494 g.) M.P. 218° (decomp.), $\lambda_{max.}^{EtOH}$ 260, 296, 330 nm. ($\epsilon$ 23,850; 10,800; 14,000)

(Found (percent): C, 52.6; H, 5.9; Br, 22.4; N, 15.5. $C_{16}H_{20}N_4O \cdot HBr$ requires (percent): C, 52.6; H, 5.8; Br, 21.9; N, 15.35.)

EXAMPLE 23

1,8-diaza-4-(2'-diethylaminoethylamino)-carbazole

A mixture of 4-chloro-1,8-diazacarbazole (0.303 g.) and N,N-diethylethylenediamine (3.0 ml.) was refluxed for 7½ hr. The cooled reaction mixture was poured into water and triturated until solid. The crude product (0.377 g.) was crystallised from acetone to give 1,8-diaza-4-(2'-diethylaminoethylamino) - carbazole (0.161 g.) M.P. 187.5–189°, $\lambda_{max.}^{EtOH}$ 252, 272, 296, 336, nm. ($\epsilon$ 27,200; 16,000; 8,850; 16,000)

(Found (percent): C, 68.1; H, 7.5; N, 24.8. $C_{16}H_{21}N_5$ requires (percent): C, 67.8; H, 7.45; N, 24.7.)

EXAMPLE 24

1,8-diazacarbazole

Dipyrid-2-ylamine (103 mg.) in tetrahydrofuran (300 ml.) was irradiated through a Pyrex sleeve for 48 hr. After 6 hr., the absorbance at 264 nm. had diminished by 75%, but the rate of cyclisation later decreased. Evaporation of solvent gave a brown gum (121 mg.), which was applied in chloroform (2 ml.) to a column of Woelm alumina (Grade IV; 30 g.). Benzene-chloroform (1:1) (50 ml.) eluted unchanged dipyridylamine (8 mg.). Chloroform (50 ml.) eluted 1,8-diazacarbazole (53 mg.), M.P. 229° (from benzene), $\lambda_{max.}^{MeOH}$ 225, 261, 297, 324 nm. ($\epsilon$ 21,300, 12,100, 20,300 4,700); 227, 270, 299 nm. in acid.

(Found (percent): C, 70.9; H, 4.15; N, 25.0. $C_{10}H_7N_3$ requires (percent): C, 70.95; H, 4.15; N, 24.85.) The irradiation was repeated in the same solvent for a longer period (72 hr.) and in cyclohexane (28 hr., quartz probe) but the yield was not improved. The mass spectrum showed a molecular ion at 169. The P.M.R. spectrum in trifluoroacetic acid showed bands centred at $\tau$ 0.47 (doublet, $J_{2,3}$=8 c./sec.), $\tau$ 0.96 (doublet, $J_{3,4}$=6 c./sec.), $\tau$ 1.91 (quartet).

EXAMPLE 25

α-Carboline (1-azacarbazole)

2-anilinopyridine (102 mg.) in cyclohexane (300 ml.) was irradiated through a Pyrex sleeve for 9 hr. Evaporation of solvent and extraction with boiling benzene (2×100 ml.) gave a brown solid (91 mg.), which on recrystallisation from benzene and treatment with accitvated charcoal gave α-carboline (81 mg.), M.P. 215–216°, $\lambda_{max.}^{MeOH}$ 233, 259, 297, 327 nm. ($\epsilon$ 19,100, 12,300, 16,400, 4100); 244, 263, 268, 306 nm. in 0.02 N-methanolic HCl.

(Found (percent): C, 78.55; H, 4.9; N, 16.65. Calc. for $C_{11}H_8N_2$ (percent): C, 78.55; H, 4.8; N, 16.65.) A benzene solution of the base exhibited violet fluorescence in U.V. light. Cyclisation went equally well in tetrahydrofuran (80% yield after 8 hr.) but no change in U.V. spectrum was observed in 98% sulphuric acid. Irradiation through a quartz probe gave a lower yield (67%) of the same product.

EXAMPLE 26

β- and δ-Carbolines (2- and 4-azacarbazoles)

3-anilinopyridine (102 mg.) in tetrahydrofuran (300 ml.) was irradiated through a Pyrex sleeve for 23 hr. Analysis of the final reaction spectrum at 234 and 303 nm. showed a ratio of δ-carboline to β-carboline of 1.7:1. Solvent was evaporated and the residue in chloroform (5 ml.) applied to a column of Woelm alumina (Grade IV; 20 g.). A weight curve was determined for 30 x 10 ml. fractions. Benzene eluted δ-carboline (46 mg.), needles from benzene, M.P. 215–216°, $\lambda_{max.}^{MeOH}$ 257, 303, infl. 331 nm. ($\epsilon$ 25,300, 19,900, 6000); 263, infl. 267, 327 nm. in acid.

Chloroform eluted β-carboline (24 mg.), needles from benzene, M.P. 196–197°, $\lambda_{max.}^{MeOH}$ 234, infl. 248, 281, 287, 337, 348 nm. ($\epsilon$ 37,200, 24,000, 13,200, 24,300, 4000, 4000); 251, 303 nm. in acid.

The products (40% δ- and 19% β-carbolines) from irradiation through a quartz probe were less pure after chromatography and were sublimed at 170°/0.05 mm.

EXAMPLE 27

γ-Carboline (3-azacarbazole)

4-anilinopyridine (102 mg.) in tetrahydrofuran (300 ml.) was irradiated through a Pyrex sleeve for 22 hr. Solvent was evaporated and the residue (125 mg.) in chloroform (5 ml.) applied to a column of Woelm alumina (Grade V; 10 g.). Chloroform eluted γ-carboline (70 mg.). M.P. 228–229° (softening at 205°) (from benzene), $\lambda_{max.}^{MeOH}$ 232, 250, 255, 280, 286, 313, 324 nm. ($\epsilon$ 30,100, 26,500, 25,900, 6400, 5600, 2300, 2200), 259 nm. in acid.

A lower yield (64%) was obtained using a quartz probe, M.P. 229–230° after sublimation at 190°/0.05 mm.

EXAMPLE 28

9-methyl-1-azacarbazole (9-methyl-α-carboline)

2-(N-methylanilino)pyridine (110 mg.) in tetrahydrofuran (300 ml.) was irradiated through a Pyrex sleeve for 11 hr. Evaporation of solvent left a brown gum (128 mg.), which was applied in chloroform (2 ml.) to a column of Woelm alumina (Grade IV; 30 g.). A weight curve was determined for 20 x 10 ml. fractions. Benzene-chloroform (1:1) eluted a colourless oil, which solidified in petroleum ether (B.P. 30–50°) to give 9-methyl-1-azacarbazole (80 mg.), M.P. 52°

$\lambda_{max.}^{MeOH}$ 234, 263, 298, 337 nm. ($\epsilon$ 17,800, 14,400, 14,300, 3300); 249, 271, 306, 349 nm. in acid.

EXAMPLE 29

4-chloro-1,3,8-triazacarbazole 4-chloro-6-(2'-pyridylamino)-pyrimidine (0.7 g.) in t-butanol (2 l.) was irradiated with two Philips ultraviolet fluorescent tubes (30 watts; main emission at 254 nm.) for 4 hr. Evaporation of the solvent gave a solid (0.9 g.) which was extracted from some insoluble material (0.185 g.) with a mixture of chloroform and tetrahydrofuran (1:2.3) (50 ml.). The organic phase was washed with 2 N hydrochloric acid and water. Removal of the solvent gave 4-chloro-1,3,8-triazacarbazole (0.2 g.), M.P. 253–256°, $\lambda_{max.}^{EtOH}$ 226, 253, 292 nm. ($\epsilon$ 18,360, 11,900, 8160)

The starting material was prepared as follows: 4,6-dichloropyrimidine (3.7 g.), 2-aminopyridine (2.35 g.), sodium hydrogen carbonate (2.1 g.) and dimethylformamide (20 ml.) were heated at 110° for 4 hr. The reaction mixture was poured into water and the product isolated with ethyl acetate. Solvent was evaporated and the residue (2.2 g.) in chloroform (50 ml.) was adsorbed onto a column of silica gel (250 g.). Development with chloroform eluted 4,6-dichloropyrimidine (0.175 g.) followed by 4-chloro-6-(2'-pyridylamino)-pyrimidine (0.570 g.), M.P. 171.5–172.5° (from acetonitrile), $\lambda_{max.}^{EtOH}$ 263, 300, nm. ($\epsilon$ 18,130, 19,500)

(Found (percent): C, 52.5; H, 3.6; Cl, 16.6; N, 27.2. $C_9H_7ClN_4$ requires (percent): C, 52.3; H, 3.4; Cl, 17.1; N, 27.1.)

EXAMPLE 30

4-(n-butylamino)-1,3,8-triazacarbazole 4-chloro-1,3,8-triazacarbazole (0.06 g.) and n-butylamine (1 ml.) were heated under reflux for 1 hr. The reaction mixture was diluted with water and the product isolated with ethyl acetate. Removal of the solvent gave a solid which was dissolved in ethanol and acidified with ethanolic hydrogen bromide solution. Removal of the solvent and crystallisation of the residue from ethanol (3 ml.) gave 4-(n-butylamino)-1,3,8-triazacarbazole hydrobromide, $\lambda_{max.}^{EtOH}$ 226, 258, 291, 320 nm. ($\epsilon$, 21,300, 19,600, 9700, 5400)

(Found (percent): C, 47.8; H, 4.9; N, 21.2; Br, 25.2. $C_{13}H_{16}BrN_5$ requires (percent): C, 48.4; H, 5.0; N, 21.7; Br, 24.8.)

EXAMPLE 31

1,6-diazacarbazole 2,4'-dipyridylamine (C. Zwart and J. P. Wibaut Rec. trav. chim. (1955), 74, 1081) (0.84 g.) dissolved in a mixture of tertiary butanol (1.900 ml.) and absolute ethanol (100 ml.) was irradiated with light from a 30 watt ultraviolet fluorescent tube (main emission at 254 nm.) for 29 hr. The solvents were evaporated and the residual gum partitioned between ethyl acetate and dilute hydrochloric acid. The basic material (0.40 g.) was isolated and separated by preparative layer chromatography affording a crude product (0.081 g.) that was crystallised from ethanol to give 1,6-diazacarbazole (0.023 g.) M.P. 281–5°. (Found (percent): C, 71.4; H, 4.3; N, 24.5. $C_{10}H_7N_3$ requires (percent): C, 71.0; H, 4.15; N, 24.8.)

What is claimed is:

1. A process for the production of an azacarbazole, comprising photocyclysing a secondary or tertiary diarylamine in which each of the two aryl groups is a monocyclic six membered ring attached to the amine nitrogen atom by a nuclear carbon atom and at least one aryl group contains at least one nitrogen atom in the nucleus and isolating the azacarbazole so produced.

2. A process as claimed in claim 1 in which the amine nitrogen atom of said diarylamine carries a hydrogen atom or an aliphatic or araliphatic substituent which may carry one or more amino, mono- or di-alkyl-amino, hydroxy or ether groups.

3. A process as claimed in claim 1 in which one or both of the two aryl groups of the diarylamine carry one or more aliphatic hydrocarbon groups, halogen atoms or residues of nucleophiles.

4. A process as claimed in claim 3 in which said residues of nucleophiles are amino groups carrying one or two saturated, or unsaturated, straight, branched or cyclic aliphatic groups.

5. A process as claimed in claim 1 in which at least one of said aryl groups is a carbon-attached pyridyl, pyrimidyl or pyrazinyl group.

6. A process as claimed in claim 1 in which the diarylamine is a 2-, 3- or 4-anilino-pyridine, a bispyrid-2-ylamine, a 4-anilinopyrimidine, a 2-anilinopyrazine, a 4-(pyrid-2-ylamino)-pyrimidine, a bispyrid-4-ylamine or a 2,4'-dipyridylamine.

7. A process as claimed in claim 1 in which the photocyclisation is effected in solution at a concentration not greater than 1.0% w./v.

8. A process as claimed in claim 1 in which the photocyclisation is effected by irradiation of the diarylamine with radiation in the wavelength range 240–360 mm.

References Cited

UNITED STATES PATENTS

| | | | |
|---|---|---|---|
| 3,046,209 | 7/1962 | Sprague | 204—158 |
| 3,196,097 | 7/1965 | Ide et al. | 204—158 |

HOWARD S. WILLIAMS, Primary Examiner